United States Patent Office 3,558,406
Patented Jan. 26, 1971

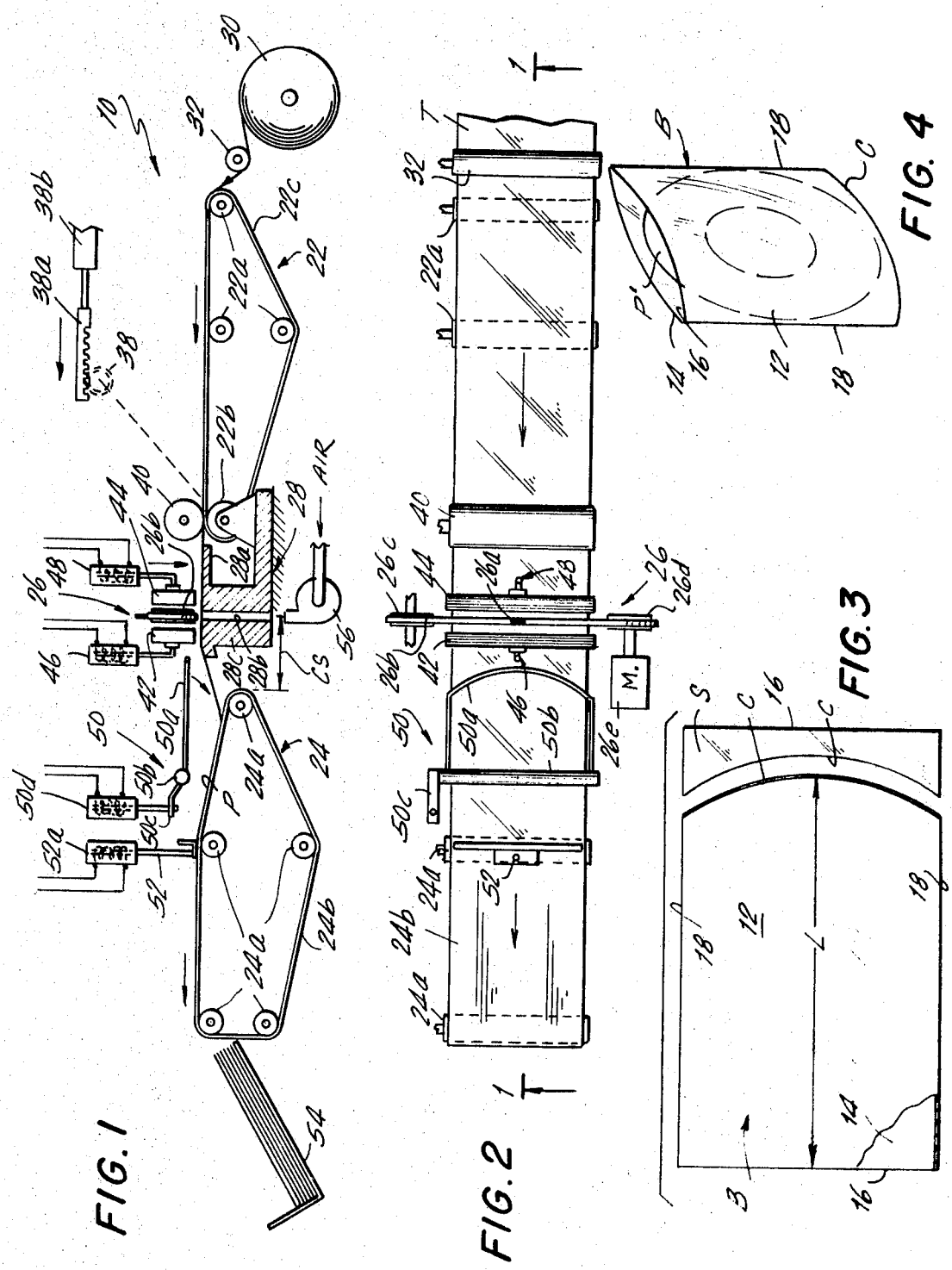

3,558,406
BOTTOM SEAL CONTOUR BAG MANUFACTURE
Emanuel Kugler, 124 Richmond Place,
Lawrence, N.Y. 11559
Filed Oct. 23, 1967, Ser. No. 677,189
Int. Cl. B32b *31/08, 31/20*
U.S. Cl. 156—515
2 Claims

ABSTRACT OF THE DISCLOSURE

Apparatus for manufacturing plastic bags having a sealed bottom edge in the operation of which a transversely applied line of heat sealing simultaneously provides such bottom edge while cleanly severing each bag from the supply length of plastic. In prior art practice such a line of heat sealing is avoided to prevent tacking of the plastic to the supporting feed belt of the apparatus which adversely effects feed movement of the plastic through the bag-making apparatus.

---

The present invention relates generally to economically mass produced plastic bags, and more particularly to improvements in apparatus for producing such bags having a non-linear or curved sealed bottom edge.

Conventional rectangular shaped plastic bags are readily economically mass produced in that fabrication merely requires the application of a straight, transversely oriented heat seal line across the plastic tubular stock to produce the opposite side edges of each bag, the straight fold line of the plastic tubular stock between these adjacently spaced heat seal lines serving as the bag bottom edge. Extending this technique to the production of bags having a curved bottom edge, however, would result in prohibitive costs as well as other problems since both the bag side edges and bottom edge would have to be produced by heat sealing. It is therefore desirable to make use of the opposite fold lines of the plastic tubular stack as the sides of the bag and to produce the usual open bag end by a transverse cut and the curved closed end by a single, transversely applied curved heat seal line. Heretofore, however, the application of this single heat seal line providing both the bottom bag edge and cleanly severing the bag from the supply length of plastic could not be achieved without adversely effecting feed movement of the plastic because of inadvertent tacking of the plastic to the feed belt or similar feeding means. As exemplified by the bags produced in accordance with the U.S. Pat. 2,800,163 issued July 23, 1957 to K. A. Rusch, it is therefore expedient according to the prior art practice of manufacturing bottom seal contour bags to form the bottom bag edge with a "non-tacking" light heat seal line which does not sever the bag from the supply length of plastic and also with an adjacent perforated line along which the bag is subsequently removed from the supply length of plastic. This has the obvious disadvantage, however, of leaving an unsightly edge along the ruptured line of perforations.

Broadly, it is an object of the present invention to provide improved bag-making apparatus overcoming the foregoing and other shortcomings of the prior art. Specifically, it is an object to provide bag-making apparatus particularly suitable for the economical mass production of bottom seal contour bags characterized by a cleanly severed, smoothly sealed bottom edge.

An apparatus for producing bottom seal contour bags demonstrating objects and advantages of the present invention includes separated first and second feed means in the operation of which the application of the heat seal line producing the sealed bottom edge is delayed until the plastic is already under the feed control of the second feed means, being applied at the separation of the two feed means. Applying this heat seal at this location facilitates bag manufacture since the heat seal die is readily moved through the material into the clearance of this separation. Additionally, the resulting severed bag, which as already noted is sufficiently on the second feed means to be effectively under its control, is then easily cleared from the apparatus by this feed means. Thus, tacking which may result from applying a heat seal which severs the plastic is not permitted to interfere with feed movement of the plastic, particularly in the critical move from the first to the second feed means, since the plastic has already made this movement when sealed.

The above brief description, as well as further objects, features and advantages of the present invention, will be more fully appreciated by the reference to the following detailed description of a presently preferred, but nonetheless illustrative embodiment in accordance with the present invention, when taken in conjunction with the accompanying drawings, wherein:

FIG. 1 is a diagrammatic elevational view, in section taken on line 1—1 of FIG. 2, of bag making apparatus according to the present invention;

FIG. 2 is a plan view of the apparatus illustrating further structural details;

FIG. 3 is a plan view illustrating an exemplary bag, with selvage, as produced by the apparatus hereof; and FIG. 4 is an isolated perspective view of the bag and of a typical product.

Reference is now made to the drawings wherein there is shown exemplary bag making apparatus, generally designated 10, according to the present invention. More particularly, apparatus 10 is advantageously used in the economical mass production of bags B as shown in FIGS. 3, 4, having a specified length L and characterized by a non-linear or curved bottom sealed edge C. Additionally, each bag B has the usual front and rear walls 12, 14 bounding a straight upper bag opening 16 into its interior. Opposite fold lines 18 in the tubular plastic stock serve as the side edges of the bag. The previously noted bottom edge C is the closed end of the bag and is formed by a line of heat sealing which cleanly severs the bag B from the supply length of tubular plastic material.

During manufacture, a selvage S is created between bags which, as best shown in FIG. 3, is bounded on one side by the curved seal line C and on the other side by the transverse cut 16. Each bag B, because of the curved sealed bottom edge C, is particularly suitable for packaging round objects such as plates P'.

Turning now to the construction and mode of operation of the apparatus 10, in the preferred embodiment illustrated herein such apparatus includes two material feed means 22 and 24 arranged in tandem with a maximum clearance space CS therebetween which is less than one bag-length L. In this regard, reference is to the portion of the separation consisting of the clearance space CS which exists between the feed means 22 and 24 and which is significant to and has an effect on efficient operation of the apparatus 10, namely that extent of separation between the first encountered section of the feed means 24 and the vertical cutting plane of a cutting means 26 located between the feed means 22 and 24. The remaining extent of separation has a support 28 to guide the material during transfer between the feed means 22 and 24 and thus does not present any particular problem.

The bags B are fabricated out of tubular plastic stock P put up in a supply roll 30 at the front or right side of the machine as illustrated in FIGS. 1, 2. The tubular plastic material P is unwound from the supply roll 30, threaded under a guide roller 32 and onto a feed belt 22c appropriately supported on support rollers, herein individually and collectively designated 22a, 22b; roller 22b being further appropriately connected by a pulley belt or similar means to a drive roller 38 which, in turn, is intermittently powered to advance the plastic P, a bag-length L at a time. The powering means may be a rack 38a in meshing engagement with the drive roller 38 and of a sufficient extent such that the stroke thereof provided by an air cylinder 38b or the like results in the advancement of the plastic P for an extent at least equal to a bag-length L plus the longitudinal extent of the selvage S. Since, as previously noted, this extent of advance of the plastic P exceeds the clearance space CS, enough plastic tubular material is thus moved forward of the cutting plane of the cutting means 26 to span the clearance space CS between the two feed means 22 and 24. Facilitating this advance of plastic material is an idler pressure roller 40 which cooperates with the driven roller 22b to firmly engage the plastic P therebetween.

Immediately forward of the rollers 22b, 40 is the previously noted support 28 which includes a horizontally oriented portion 28a for guiding the plastic P from the rollers 22b, 40 into cutting position at the cutting station located at the end of the feed means 22.

At the cutting station is a cutting means 26 which may be of the usual vertical reciprocating guillotine type or else may be of the flying knife type, such as illustrated herein. The cutter 26 includes a cutting implement 26a mounted in a cutting position on a pulley belt 26b trained about pulleys 26c, 26d, the latter pulley 26d being driven by a motor 26e. In practice, operation of the motor 26e is effective to cause cutting movement of the cutting implement 26a transversely of the plastic P and producing a transverse cut 16 therein. During this cutting stroke, the cutting implement 26a extends into a cutting slot 28b bounded by the previously noted support 28a and an adjacent portion 28c thereof. Complementing the cutting means 26 are two holding clamps 42, 44 located on opposite sides of the cutting plane and each actuated through vertical reciprocating movement by pressure air controlled by solenoid operated valves 46, 48 respectively. Specifically, clamps 42 and 44 cooperate with the supports 28c and 28a to hold the plastic P engaged therebetween against movement during the cutting stroke of the knife 26a.

Located just forward of the cutting means 26 is a conventional heat sealing means 50 including a heat sealing wire or die 50a having an appropriately curved shape to provide the previously noted non-linear or curved sealed edge C. That is, operating in a well understood manner, the heat sealing wire 50a is raised to a sufficiently high temperature such that when subsequently brought into contact with the plastic P it is effective in sealing the plastic at the point of contact to provide the sealed edge C and also to sever the plastic along this edge. Shaft 50b, appropriately journaled for pivotal movement, mounts the heat sealing wire 50a and is operatively connected, via an actuating member 50c, to be actuated through pivotal movement by pressure air controlled by a solenoid operated valve 50d.

Located at the exit or left side of the apparatus 10, as viewed FIGS. 1, 2, is the previously noted second feed means 24 consisting of transversely oriented support rollers, individually and collectively designated 24a, and a belt 24b appropriately trained about and supported on these rollers. Cooperating with the feed means 24 is a vertically reciprocating clamp 52 which, like the previously described clamps, is advantageously operated by pressure air controlled by a solenoid operated valve 52a. Although not shown, it will be understood that feed means 24 is similarly intermittently operated by powering means such as a rack or the like to thereby transport successively manufactured bags B clear of the apparatus 10, into a loading tray 54 or possibly even directly to bag-wicketing apparatus (not shown).

Thus, the aforesaid bag-manufacturing apparatus 10 has the following simplified mode of operation. Assuming a starting condition of the apparatus wherein a supply length of plastic P is unwound from the supply roll 30 and extended therefrom to a forward position up to the cutting plane of the cutting means 26, the sequence in bag making consists of a first powering stroke of the rack 38a which results in the advancement of the leading edge 16 of the plastic P from the cutting plane of the cutting means 26 across the clearance space CS and onto the feed means 24 up to the plane of operation of the clamp 52. To facilitate the movement of the plastic P from the support 28c onto the belt 24b, it will be noted that the first encountered support roller 24a is situated at a lower elevation than the upper surface of the support 28c.

Following the movement of the plastic P into its operative position spanning the clearance space CS, the next significant step is the operation of the holding clamps 52, 42 and 44 which result in the firm engagement of the leading edge of the plastic P and also of the portions thereof on opposite sides of the cutting plane of the cutting means 26. While the plastic P is thusly held, solenoid 50d is actuated to produce a sealing stroke of the heat sealing means 50. This, in turn, results in the heat sealing wire 50a being moved through the plastic P which produces a sealed bottom edge C extending from side to side of the plastic tubular material. This, of course, forms a bag B out of the plastic material P which is supported on the feed means 24.

Next, while the clamps 42, 44 still engage the plastic P, cutting means 26 is operated to produce a transverse cut 16 in the plastic material. As a consequence, the upper bag opening 16 of the next succeeding bag is formed and the selvage S is isolated from between adjacent bags B. As best shown in FIG. 1, located below the cutting slot 28b is a conventional blower 56 which directs air into this slot and is therefore effective in removing the selvage S clear of the apparatus 10 when the holding clamps 42, and 44 release the selvage.

After the cutting stroke, the transversely cut plastic edge 16 is again advanced by the feed means 22 onto the feed means 24 and up to the holding clamp 52 to thereby repeat the cycle of operation. During this movement, the completed bag B on the feed means 24 is advanced by the feed means 24 into the loading tray 54.

From the foregoing description of the mode of operation of the apparatus 10 it will be noted that the application of the line of heat sealing in the plastic P is delayed until the plastic has already been transported to the second feed means 24. This is significant since it has been found that any heat sealing attempted while the plastic is still on the first or front feed means 22 may inadvertently result in tacking of the plastic P to the feed belt 22c. The occurrence of this in an obvious manner complicates moving the plastic in a machine direction through the apparatus 10 and particularly into an operative position spanning the feed means 22 and 24. Thus, the mode of operation of the apparatus 10 is particularly noteworthy for the manufacture of bags B having a cleanly severed transversely oriented bottom sealed edge C, preferably of a non-linear shape, and thus represents a significant advance in the art.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. Apparatus for manufacturing bags of a predetermined bag-length from tubular plastic stock comprising a first and a second feed means respectively operatively arranged in tandem with a clearance of a predetermined lesser extent than said bag-length therebetween defining a cutting station, powering means operatively connected to intermittently operate said first feed means so as to successively transport said one bag-length of said plastic stock into said cutting station in an operative position spanning said first and second feed means, said first and second feed means including retaining means to maintain said tubular stock in position during operation of said apparatus, cutting means at said cutting station operatively arranged to produce a transverse cut in each said operatively positioned bag-length to both sever said bag-length from said tubular plastic stock and to provide an upper bag opening for the succeeding bag-length, heat sealing means adjacent said cutting means including a non-linear heat sealing die operatively arranged to produce a transverse non-linear sealed edge in each said bag-length in advance of the location of the said transverse cut to provide a non-linear closed bottom bag edge on each said bag-length, blower means at said cutting station operatively arranged to remove bag-length selvage occurring between adjacent bag lengths consisting of the portion of the plastic tubular stock defined on one side by said transverse cut and on the other side by said non-linear sealed edge with said retaining means maintaining the adjacent bag lengths in position against the force of air from said blower means, and powering means operatively connected to intermittently operate said second feed means so as to successively transport said severed bag-length clear of said apparatus.

2. Apparatus for manufacturing bags as defined in claim 1 wherein said first encountered portion of said second feed means at said cutting station is situated at a lower elevation than said cutting station to facilitate the transporting of said tubular plastic stock into said operative position spanning said first and second feed means.

References Cited

UNITED STATES PATENTS

| | | | |
|---|---|---|---|
| 2,679,280 | 5/1954 | Marsh | 156—515 |
| 2,961,031 | 11/1960 | Fener | 156—515X |
| 3,355,857 | 12/1967 | Tobey | 156—515X |
| 3,382,132 | 5/1968 | Kugler | 156—515 |

BENJAMIN A. BORCHELT, Primary Examiner

J. M. HANLEY, Assistant Examiner

U.S. Cl. X.R.

156—251